United States Patent
Chen et al.

(10) Patent No.: US 10,157,317 B2
(45) Date of Patent: Dec. 18, 2018

(54) METHOD, SYSTEM AND DEVICE FOR SECURITY INSPECTION

(71) Applicant: Nuctech Company Limited, Beijing (CN)

(72) Inventors: Zhiqiang Chen, Beijing (CN); Li Zhang, Beijing (CN); Jin Cui, Beijing (CN); Hong Wang, Beijing (CN); Huabin Tan, Beijing (CN); Dongxu Ji, Beijing (CN); Wenjing Wang, Beijing (CN); Tingting Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 156 days.

(21) Appl. No.: 15/278,502

(22) Filed: Sep. 28, 2016

(65) Prior Publication Data
US 2017/0185842 A1     Jun. 29, 2017

(30) Foreign Application Priority Data
Dec. 29, 2015   (CN) .......................... 2015 1 1020939

(51) Int. Cl.
*H04N 7/18*    (2006.01)
*H04N 19/44*   (2014.01)
(Continued)

(52) U.S. Cl.
CPC ....... *G06K 9/00718* (2013.01); *G01V 5/0041* (2013.01); *G06K 9/00744* (2013.01);
(Continued)

(58) Field of Classification Search
CPC .......... G06K 9/00718; G06K 9/00744; G06K 9/00758; G06K 9/00765; G06K 9/4671;
(Continued)

(56) References Cited

U.S. PATENT DOCUMENTS 6,158,658 A * 12/2000 Barclay ................... B64F 1/366
                                                    235/375
7,158,676 B1 * 1/2007 Rainsford .......... H04N 7/17318
                                                    348/700
(Continued)

FOREIGN PATENT DOCUMENTS

CN     202120336 U     1/2012
CN     204287075 U     4/2015
(Continued)

*Primary Examiner* — Huy T Nguyen
(74) *Attorney, Agent, or Firm* — Scully Scott Murphy & Presser (57) ABSTRACT

The present disclosure relates to a method, a system and a device for security inspection, pertaining to the field of security inspection. The method includes: before a baggage enters a security inspection machine and/or after the baggage leaves the security inspection machine, acquiring information about the baggage and information about a subject person; while the baggage is inside the security inspection machine to be scanned, acquiring a scanned image of the baggage; and correlating the information about the baggage, the scanned image of the baggage and the information about the subject person in a storage system, wherein acquiring information about the baggage and information about a subject person includes analyzing a video.

10 Claims, 4 Drawing Sheets

(51) Int. Cl.
  G06K 9/00      (2006.01)
  G01V 5/00      (2006.01)
  G06K 9/46      (2006.01)
  G06T 7/00      (2017.01)
  H04N 21/2187   (2011.01)
  H04N 21/61     (2011.01)
  H04N 21/845    (2011.01)
  H04N 19/29     (2014.01)

(52) U.S. Cl.
  CPC ..... *G06K 9/00758* (2013.01); *G06K 9/00765* (2013.01); *G06K 9/4671* (2013.01); *G06T 7/0081* (2013.01); *H04N 7/181* (2013.01); *H04N 7/183* (2013.01); *H04N 19/44* (2014.11); *H04N 21/2187* (2013.01); *H04N 21/6125* (2013.01); *H04N 21/845* (2013.01); *G06K 2009/4666* (2013.01); *G06T 2207/10116* (2013.01); *G06T 2207/20144* (2013.01); *H04N 19/29* (2014.11)

(58) Field of Classification Search
  CPC .......... G06K 2009/4666; G06T 7/0081; G06T 2207/10116; H04N 7/181; H04N 7/183; H04N 21/2187; H04N 21/6125; H04N 21/845; H04N 19/29; H04N 19/44
  See application file for complete search history.

(56) References Cited

U.S. PATENT DOCUMENTS

2010/0157090 A1* 6/2010 Kobayashi ............... H04N 5/77
                                                     348/222.1
2017/0357857 A1* 12/2017 Perron .................... G06K 9/66

FOREIGN PATENT DOCUMENTS

CN       104597514 A        5/2015
CN       204993673 U        1/2016
GB         2448293 A   * 10/2008    ............. A45C 11/18

* cited by examiner

METHOD, SYSTEM AND DEVICE FOR SECURITY INSPECTION

CROSS-REFERENCE TO RELATED APPLICATIONS

The present application is based upon and claims priority to Chinese Patent Application No. CN 201511020939.5 filed Dec. 29, 2015, the entire contents of which are incorporated herein by reference.

TECHNICAL FIELD

The present disclosure generally relates to the field of security inspection, and more particularly, to a method, a system and a device for security inspection of a correlated human body and baggage.

BACKGROUND

At present, for security inspection of public on roads, railway stations and other public places, a security officer generally verifies an identity of a subject person by checking his or her ID card. The subject person's baggage is generally inspected through an image generated by scanning with radiation rays (such as X rays) emitted from a particular device (such as a security inspection machine). In addition, a monitoring camera can capture and store videos of an inspection region in that place.

In the method above, inspection of the identity of the person, the baggage and the monitoring video of the inspection region are performed independently from one another without correlation. After a security accident happens, it is difficult to track other information only based on single inspection result (such as a package left in the place or a face of a suspect in the monitoring video).

Therefore, there is a demand for a novel method and a system for security inspection.

The above contents disclosed in the BACKGROUND section are merely for better understanding of the background of the present disclosure, it does not constitute prior art known to the ordinary skilled in the art.

SUMMARY

In view of the above, the present disclosure provides a method, a system and a device for security inspection which can provide correlation among information acquired in the security inspection and improve the usability of information acquired in the security inspection.

Additional aspects and advantages of the present disclosure will be set forth in the following description and become apparent from the description, or can be partly learned from practice of the present disclosure.

According to one aspect of the present disclosure, a method for security inspection. The method includes: before a baggage enters a security inspection machine and/or after the baggage leaves the security inspection machine, acquiring information about the baggage and information about a subject person; while the baggage is inside the security inspection machine to be scanned, acquiring a scanned image of the baggage; and correlating the information about the baggage, the scanned image of the baggage and the information about the subject person in a storage system, wherein acquiring information about the baggage and information about a subject person includes analyzing a video.

According to an embodiment of the present disclosure, acquiring information about the baggage includes: acquiring a video of the baggage; and analyzing the video of the baggage to acquire entrance baggage information about the baggage.

According to an embodiment of the present disclosure, acquiring information about a subject person includes: acquiring a baggage retrieving video; and analyzing the baggage retrieving video to acquire the information about the subject person who retrieves the baggage.

According to an embodiment of the present disclosure, analyzing the baggage retrieving video to acquire the information about the subject person includes: analyzing the baggage retrieving video to acquire exit baggage information and the information about the subject person; and matching the exit baggage information with the entrance baggage information to identify the baggage when the baggage leaves the security inspection machine.

According to an embodiment of the present disclosure, analyzing the baggage retrieving video to acquire the information about the subject person includes: matching a time when the baggage enters the security inspection machine with a time when the baggage leaves the security inspection machine, to identify the baggage when the baggage leaves the security machine; and analyzing the baggage retrieving video to acquire the information about the subject person who retrieves the baggage.

According to an embodiment of the present disclosure, acquiring a scanned image of the baggage includes: matching a calculated time when the scanned image of the baggage is generated with an actual time when the scanned image is generated, to acquire the scanned image of the baggage.

According to an embodiment of the present disclosure, analyzing a video includes: decoding a stream of a video to extract a single frame; marking an interested region and an interested line on an image of the frame; detecting a dynamic object in the interested region; acquiring a foreground view and performing opening and closing process on the foreground view; once in the processed foreground view, the dynamic object has crossed the interested line, comparing the current frame with a state of the preceding frame and determining whether the current frame is a key frame; if the current frame is a key frame, extracting and storing information about a baggage of the dynamic object in the key frame; and if it is not a key frame, extracting a next frame.

According to an embodiment of the present disclosure, analyzing a video includes: dividing a real-time stream of video data into data of a plurality of time segments; and processing the data of a plurality of time segments in parallel.

According to an embodiment of the present disclosure, the method further includes storing the information about the baggage, the scanned image of the baggage and the information about the subject person who retrieves the baggage in a system server.

According to an embodiment of the present disclosure, the information about the baggage includes at least one of: an image, a color and a size.

According to an embodiment of the present disclosure, the information about the subject person who retrieves the baggage can include at least one of: an image of the face, a fragment of the baggage retrieving video.

According to an embodiment of the present disclosure, the scanned image can be an X-ray image.

According to another aspect of the present disclosure, a system for security inspection. The system includes: a baggage-information acquiring module configured to, before a baggage enters a security inspection machine and/or after the baggage leaves the security inspection machine, acquire information about the baggage; a baggage-scanned-image acquiring module configured to, while the baggage is inside the security inspection machine to be scanned, acquire a scanned image of the baggage; a person-information acquiring module configured to, before a baggage enters a security inspection machine and/or after the baggage leaves the security inspection machine, acquire information about a subject person corresponding to the baggage; a correlation module configured to correlate the information about the baggage, the scanned image of the baggage and the information about the subject person in a storage system; and a video analyzing module configured to analyze a video for the baggage-information acquiring module and the person-information acquiring module.

According to an embodiment of the present disclosure, the baggage-information acquiring module includes: a baggage-video acquiring unit configured to acquire a video of the baggage; a baggage analyzing unit configured to analyze the video of the baggage to acquire entrance baggage information about the baggage.

According to an embodiment of the present disclosure, the person-information acquiring module includes: a baggage-retrieving-video acquiring unit configured to acquire a baggage retrieving video; and a baggage-retrieving analyzing unit configured to analyze the baggage retrieving video to acquire the information about the subject person who retrieves the baggage.

According to an embodiment of the present disclosure, the baggage-retrieving analyzing unit includes: a baggage analyzing sub-unit configured to analyze the baggage retrieving video to acquire exit baggage information; a retriever analyzing sub-unit configured to analyze the baggage retrieving video to acquire the information about the subject person who retrieves the baggage; and a baggage matching sub-unit configured to match the exit baggage information with the entrance baggage information to identify the baggage when the baggage leaves the security inspection machine.

According to an embodiment of the present disclosure, the baggage-retrieving analyzing unit includes: a first time-matching sub-unit configured to match a time when the baggage enters the security inspection machine with a time when the baggage leaves the security inspection machine, to identify the baggage when the baggage leaves the security machine; and a retriever analyzing sub-unit configured to analyze the baggage retrieving video to acquire the information about the subject person who retrieves the baggage.

According to an embodiment of the present disclosure, the baggage-scanned-image acquiring module includes: a second time-matching unit configured to match a calculated time when the scanned image of the baggage is generated with an actual time when the scanned image is generated, to acquire the scanned image of the baggage.

According to an embodiment of the present disclosure, the video analyzing module includes: a frame extracting unit configured to decode a stream of a video to extract a single frame; a marking unit configured to mark an interested region and an interested line on an image of the frame; a detecting unit configured to detect a dynamic object in the interested region; an open-close processing unit configured to acquire a foreground view and perform opening and closing process on the foreground view; a key-frame determining unit configured to, once in the processed foreground view, the dynamic object has crossed the interested line, compare the current frame with a state of the preceding frame and determine whether the current frame is a key frame; and a baggage-information extracting unit configured to, if the current frame is a key frame, extract and store information about a baggage of the dynamic object in the key frame.

According to an embodiment of the present disclosure, the video analyzing module includes: a time-segment dividing unit configured to divide a real-time stream of video data into data of a plurality of time segments; and a processing unit configured to process the data of a plurality of time segments in parallel.

According to an embodiment of the present disclosure, the system further includes a storage module configured to store the information about the baggage, the scanned image of the baggage and the information about the subject person who retrieves the baggage in a system server.

According to an embodiment of the present disclosure, the information about the baggage includes at least one of: an image, a color and a size.

According to an embodiment of the present disclosure, the information about the subject person who retrieves the baggage can include at least one of: an image of the face, a fragment of the baggage retrieving video.

According to an embodiment of the present disclosure, the scanned image can be an X-ray image.

According to yet another aspect of the present disclosure, a device for security inspection, including a camera and a security inspection machine, the camera is disposed at an entrance side and/or an exit side of the security inspection machine and configured to acquire a video of a baggage and a video of a subject person before the baggage enters the security inspection machine and/or after the baggage leaves the security inspection machine; and the security inspection machine is configured to scan a baggage while the baggage is inside the security inspection machine to be scanned, to generate a scanned image of the baggage.

According to an embodiment of the present disclosure, the camera includes a first camera and a second camera, wherein the first camera is disposed at the entrance side of the security inspection machine, configured to acquire an entrance baggage video before the baggage enters the security inspection machine, and the second camera is disposed at the exit side of the security inspection machine, configured to acquire and extract a video of the subject person who retrieves the baggage after the baggage leaves the security inspection machine.

According to an embodiment of the present disclosure, the device further includes a controlling unit, the controlling unit includes the system of any of the above described.

According to the method, the system and the device for security inspection of the present disclosure, by correlating and binding image and information of the subject person, the baggage carried with him or her and the X-ray image of the baggage, images of the person, the baggage carried with him or her and the scanned image of the baggage can be correlated such that a person can correspond to his or her baggage. In this way, it can significantly improve the efficiency of security inspection of the subject person and baggage carried with him or her. After a security accident happens, other relevant information can be automatically searched out based on a package left on the spot or information about a suspect in a monitored video. Therefore, it can provide correlation among information acquired in the security inspection and improve the usability of information acquired in the security inspection.

In addition, according to some embodiments, the method, the system and the device for security inspection of the present disclosure can capture a baggage from a video and analyze properties of the baggage.

According to another embodiment, the method, the system and the device for security inspection of the present disclosure can improve performing efficiency of the video analyzing algorithm, increase the speed of recognizing a baggage and a human face, and improve the recognition accuracy.

It is to be understood that both the foregoing general description and the following detailed description are exemplary only and are not restrictive of the present disclosure, as claimed.

BRIEF DESCRIPTION OF THE DRAWINGS

The above and other features and advantages of the present disclosure will become apparent from exemplary embodiments thereof described in detail with reference to accompanying drawings.

DETAILED DESCRIPTION

Hereinafter, the exemplary embodiments will be described more fully with reference to the accompanying drawings. However, the exemplary embodiments can be implemented in various manners, and should not be understood as limited to the embodiments set forth herein. Instead, these embodiments are provided to make the present disclosure more thorough and complete, and to fully convey the concept of the exemplary embodiments to those skilled in the art. Throughout the accompanying drawings, like symbols represent like or the same structure, and thus the redundant description will be omitted.

In addition, the features, structure or characteristics described can be combined in one or more embodiments in any suitable way. In the following description, more specific details are provided to enable thorough understanding of the embodiments of the present disclosure. However, it should be appreciated by those skilled in the art that the technical solution of the present disclosure can be practiced without one or more of the particular details or can be practiced with other methods, components, materials, devices or steps and so on. In some cases, known structure, methods, devices, implementation, material or operation will not be illustrated in detail to avoid obscuration of the present disclosure.

In the accompanying drawings, a block diagram only illustrates functional modules each of which does not necessarily correspond to a separate physical component one by one. That is, these functional modules can be implemented in software, or the whole or part of these functional modules can be implemented in one or more hardware modules, for example, executed through software. Alternatively, these functional modules can also be implemented in various network and/or processor devices and/or micro controllers.

Figure 1:
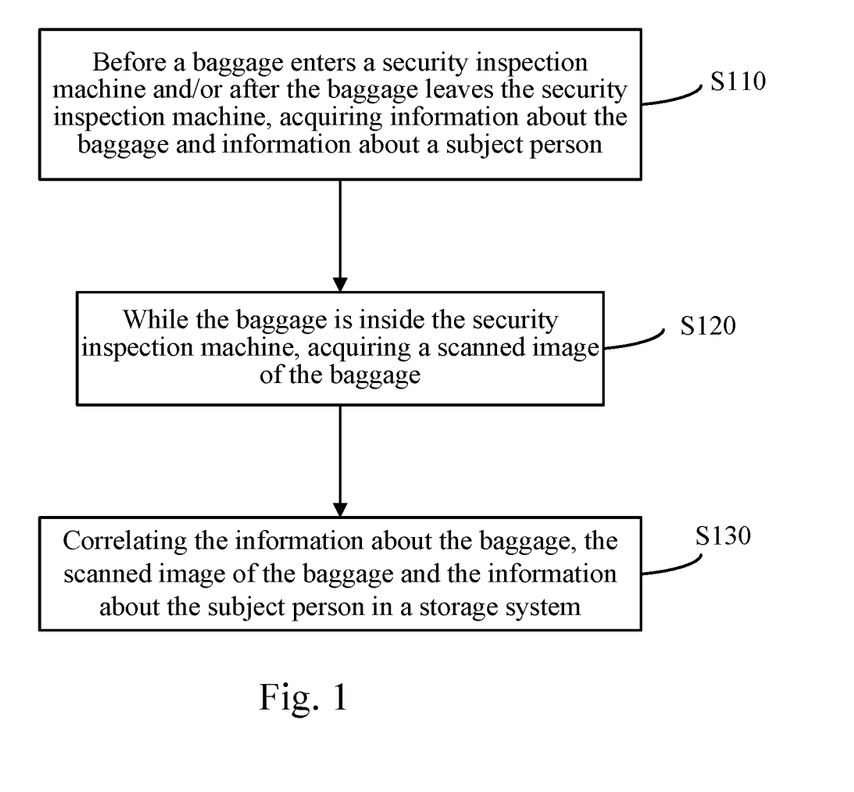
FIG. 1 is a flowchart illustrating a method for security inspection according to an exemplary embodiment of the present disclosure.

FIG. 1 is a flowchart illustrating a method for security inspection according to an exemplary embodiment of the present disclosure.

As shown in FIG. 1, at step S110, before a baggage enters a security inspection machine and/or after the baggage leaves the security inspection machine, information about the baggage and information about a subject person are acquired.

In an exemplary embodiment, before a baggage enters a security inspection machine and/or after the baggage leaves the security inspection machine, acquiring information about the baggage and information about a subject person can include: before the baggage enters a security inspection machine, acquiring the information about the baggage and the information about the subject person by a camera disposed at an entrance side of the security inspection machine. The information about the baggage and the information about the subject person can be acquired at the same time by the same camera. In this case, through image processing, the information about the baggage and the information about the subject person can be extracted separately. Alternatively, two cameras can be disposed at the entrance side of the security inspection machine. In this case, one of the cameras is configured to acquire the information about the subject person, and the other of the cameras is configured to acquire the information about the baggage.

In an exemplary embodiment, before a baggage enters a security inspection machine and/or after the baggage leaves the security inspection machine, acquiring information about the baggage and information about a subject person can include: after the baggage leaves the security inspection machine, capturing a video about the baggage when the baggage is being retrieved by the subject person (hereinafter referred to as baggage retrieving video), by a camera disposed at an exit side of the security inspection machine, and analyzing the baggage retrieving video to acquire the information about the baggage and the information about the subject person.

In an exemplary embodiment, before a baggage enters a security inspection machine and/or after the baggage leaves the security inspection machine, acquiring information about the baggage and information about a subject person can include: before the baggage enters the security inspection machine, acquiring information about the baggage at an entrance side of the security inspection machine (hereinafter referred to as entrance baggage information); after the baggage leaves the security inspection machine, acquiring a baggage retrieving video, and analyzing the baggage retrieving video to acquire the information about the baggage at an exit side of the security inspection machine (hereinafter referred to as exit baggage information) and the information about the subject person; and matching the entrance baggage information with the exit baggage information through an algorithm (for example, time and/or properties of the baggage), to acquire the information about the baggage.

In an exemplary embodiment, before a baggage enters a security inspection machine and/or after the baggage leaves the security inspection machine, acquiring information about the baggage and information about a subject person can include: before the baggage enters the security inspection machine, acquiring the entrance baggage information and the information about the subject person at the entrance side of the security inspection machine (hereinafter referred to as entrance person information), by a camera disposed at the entrance side of the security inspection machine; after the baggage leaves the security inspection machine, acquiring a baggage retrieving video, and analyzing the baggage retrieving video to acquire the exit baggage information and the information about the subject person at an exit side of the security inspection machine (hereinafter referred to as exit person information); and through an algorithm, matching the entrance baggage information with the exit baggage information to acquire the information about the baggage, and matching the entrance person information with the exit person information to acquire the information about the subject person.

In an exemplary embodiment, acquiring information about the baggage can include: acquiring a video of the baggage; and analyzing the video of the baggage to acquire entrance baggage information about the baggage.

In an exemplary embodiment, acquiring information about a subject person can include: acquiring a baggage retrieving video; and analyzing the baggage retrieving video to acquire the information about the subject person who retrieves the baggage.

At step S120, while the baggage is inside the security inspection machine to be scanned, a scanned image of the baggage is acquired.

At step S130, the information about the baggage, the scanned image of the baggage and the information about the subject person are correlated in a storage system. In an embodiment, acquiring the information about the baggage and acquiring the information about the subject person can include analyzing a video.

In an exemplary embodiment, analyzing the baggage retrieving video to acquire the information about the subject person can include: analyzing the baggage retrieving video to acquire the exit baggage information at the exit side of the security inspection machine and the information about the subject person; and matching the exit baggage information with the entrance baggage information, so as to identify the baggage when the baggage leaves the security inspection machine.

In an exemplary embodiment, analyzing the baggage retrieving video to acquire the information about the subject person can include: matching a time when the baggage enters the security inspection machine with a time when the baggage leaves the security inspection machine, so as to identify the baggage when the baggage leaves the security machine; and analyzing the baggage retrieving video to acquire the information about the subject person who retrieves the baggage.

In an exemplary embodiment, acquiring a scanned image of the baggage can include: matching a calculated time when the scanned image of the baggage is generated with an actual time when the scanned image is generated, to acquire the scanned image of the baggage.

In an exemplary embodiment, the method can also include: storing the information about the baggage, the scanned image of the baggage and the information about the subject person who retrieves the baggage in a system server.

In an exemplary embodiment, the information about the baggage can include at least one of the following: an image, a color and a size.

In an exemplary embodiment, the information about the subject person who retrieves the baggage can include at least one of the following: an image of the face, a fragment of the baggage retrieving video. The image of the face can be acquired by utilizing any one of an existing face processing algorithm, which is not limited in the present disclosure.

In an exemplary embodiment, the scanned image can be an X-ray image.

In an exemplary embodiment, a subject person (such as a subway or railway passenger) puts his or her packed baggage (briefly referred to as baggage) on a conveyor belt of a security inspection machine. At this time, a first camera disposed at an entrance side of the security inspection machine acquires a video of the baggage. A system server acquires the video of the baggage, analyzes the video of the baggage using a video analyzing algorithm to obtain information about the baggage. The information about the baggage can include properties of the baggage, such as a color, a size, a brand, wear and tear and even material of the baggage, and so on. Afterwards, the baggage enters the security inspection machine with the conveyor belt of the security inspection machine at a uniform speed. Then, the security inspection machine scans the baggage to generate a scanned image of the baggage, such as an X-ray image. The system server acquires the X-ray image of the baggage. Next, the baggage keeps moving forward with the conveyor belt of the security inspection machine, and comes out from an exit side of the security inspection machine. After the security inspection of the baggage is completed, the subject person retrieves his or her baggage from the conveyor belt of the security inspection machine. At this time, a second camera installed at the exit side of the security inspection machine captures a video of the baggage and a video of the subject person corresponding to the baggage, for example, a video of the face of the subject person. The system server acquires the video, and extracts the face image of the subject person through a face identifying algorithm. The system server binds and correlates the information about the baggage (including the entrance baggage information, the exit baggage information and information about matching the both), the face image of the subject person and the X-ray image of the baggage.

In an exemplary embodiment, the security officer can retrieve other correlated information based on a property of a face or a property of a baggage (that is, searching for a baggage based on a person or searching for a person based on a baggage). If the security officer finds a suspect person, the security officer can search based on the face of the suspect person. If correlated information is searched out, a video of the baggage, an image of the baggage and an X-ray image of the baggage of the suspect person on the spot can be acquired. In another example, if the security officer finds a suspect baggage, the security officer can search a suspect person based on the property of the baggage. If correlated information is searched out, information about the face of the suspect person and an X-ray image of the baggage can be acquired.

Figure 2:
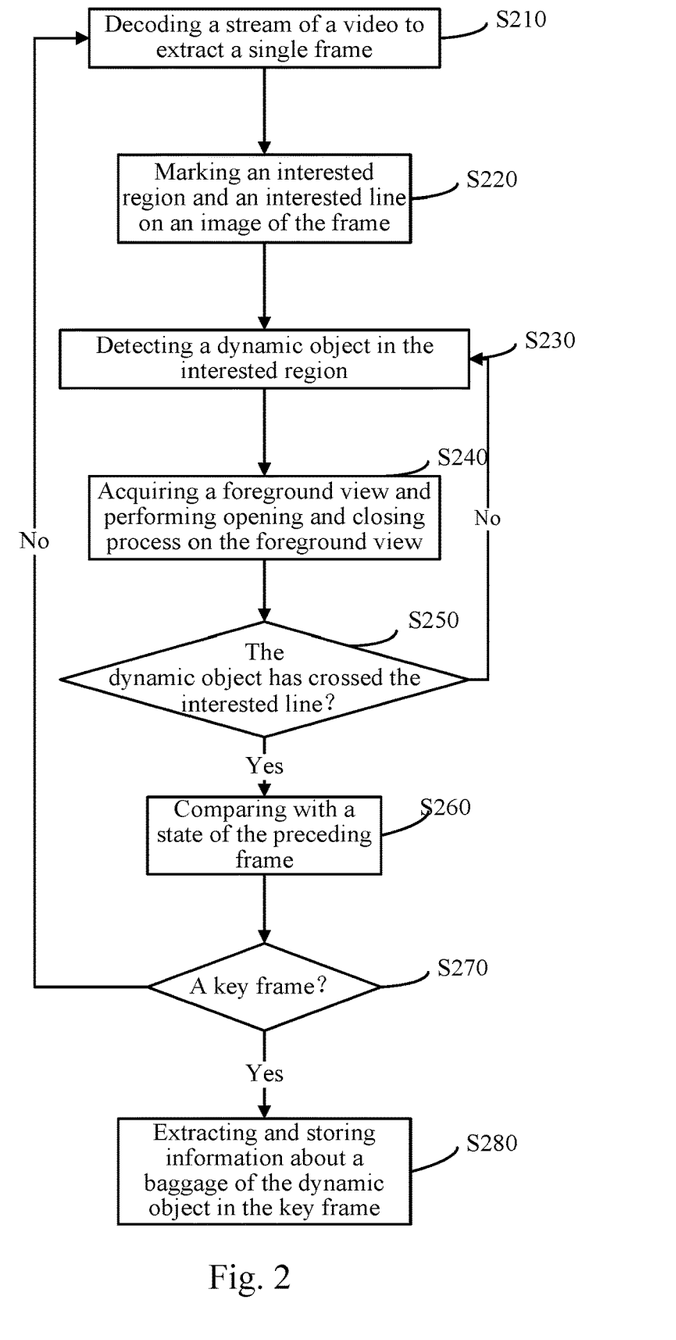
FIG. 2 is a flowchart illustrating a method for analyzing a video based on the method for security inspection of FIG. 1.

FIG. 2 is a flowchart illustrating a method for analyzing a video based on the method for security inspection of FIG. 1.

As shown in FIG. 2, at step S210, a stream of a video is decoded to extract a single frame.

At step S220, an interested region and an interested line are marked on an image of the frame.

In an exemplary embodiment, the video of the baggage is analyzed, and an input stream of the video is decoded to extract a single frame as a current frame. An interested region is marked on the image of the current frame according to relevance to the baggage. For example, when the baggage is put down, the camera will acquire an image of a hand of the subject person and an image of the baggage at the same time. In another example, when the baggage moves forward with the conveyor belt of the security inspection machine to a lead curtain of the security inspection machine, the lead curtain flips up, causing the camera to capture an image of the lead curtain and an image of the baggage at the same time. In this case, in the image of the frame, the interested region will be a region excluding the portion of the hand and the lead curtain, and only including the baggage.

At step S230, an object with position changed through the frames of images (hereinafter referred to as a dynamic object) in the interested region is detected.

At step S240, a foreground view is acquired and is processed with an open-close algorithm.

In an exemplary embodiment, the term foreground view can be understood with respect to a background view and a further-background view. The foreground view, background view and the further-background view overlap with one another. The further-background view is the lowest, the background view is located over the further-background view, and the foreground is located on the uppermost surface.

In an exemplary embodiment, the open-close algorithm is a basic operation utilizing morphology, used for observing and processing an image, and improving the quality of the image; and describing and defining geometric parameters and characteristic of the image, such as an area, a perimeter, connectivity, a particle size, skeleton and orientation.

In an exemplary embodiment, morphology operation for a binary image or morphology operation for a gray scale image can also be used. Basic morphology operations for a binary image include erosion and dilation. Erosion is a process to eliminate all boundary points of an object. The result of the process is to cause an area of remaining part of the object smaller than the original object by a size of a pixel along the periphery. If the object is a circle, its diameter will be reduced by two pixels after one time of erosion. If at a certain point the object there are less than three pixels communicated with each other in any direction, the object will split into two objects at that point after one time of erosion. Dilation is a process to incorporate all points in the background in contact with an object into the object. The result of the process is to increase the area of the object by corresponding points. If the object is a circle, its diameter will be increased by two pixels after one time of dilation. If two objects are separated by less than three pixels at a certain point in any direction, the two objects will be communicated at this point.

Erosion can be used for eliminating small noise regions in an image, and dilation can be used for filling holes in an object. Operation of firstly performing erosion on an image and then performing dilation on the image is referred to as opening operation. It can eliminate tiny objects, isolating objects at a tiny point, and smoothening boundary of a large object without significantly changing its area. On the other hand, operation of firstly performing dilation on an image and then performing erosion on the image is referred to as closing operation. It can be used for filling tiny holes inside an object, connecting adjacent objects, and smoothening boundary of an object without significantly changing its area.

In general, after an image with noise is transformed to a binary image with respect to a threshold, the boundary is not smooth, the region of the object has some erroneous holes and the background region has some small noise objects scattered therein. Continuous opening operation and closing operation can significantly improve these defects. After several times of iterative erosion and the same times of dilation, a desirable effect can be achieved. After such processing, the noise points in the image can be desirably eliminated, and the edge of the image can be smoothened.

At step S250, it is determined whether the dynamic object has crossed the interested line in the processed frame. If the moving object has crossed the interested line, the process of the method proceeds to the next step; otherwise, the process returns to step S230.

At step S260, the current frame is compared with a state of a preceding frame.

At step S270, it is determined whether the current frame is a key frame based on the comparison result. If the current frame is a key frame, the process of the method proceeds to the next step; otherwise, the process returns to step S210 to extract the next frame.

At step S280, information about a baggage of the dynamic object in the key frame is extracted and stored.

In an exemplary embodiment, the method can also include: marking an interested line on the image of the frame; detecting a dynamic object in the interested region; acquiring a foreground view and performing opening and closing process on the foreground view; once it is detected that the dynamic object has crossed the interested line in the processed frame, comparing the current frame with a state of a previously stored preceding frame. Here, the state of the preceding frame can be, for example, whether the dynamic object has crossed the interested line in the preceding frame. If the state of the preceding frame is that the dynamic object has crossed the interested line in the preceding frame, it means that the information about the baggage has been stored. In this case, the operation of storing and extracting the information of the baggage may be skipped for the current frame. Otherwise, if the state of the preceding frame is that the dynamic object has not crossed the interested line in the preceding frame, it means that information of the baggage has not be stored and the current frame is the first frame in which the dynamic object has crossed the interested line. In this case, the current frame is stored as the key frame, and the information about the baggage of the dynamic object in the key frame is extracted. In this way, it can reduce the storage space of the system, improve the processing speed of the algorithm, and eliminate redundant storage and extraction of the same baggage.

Figure 3:
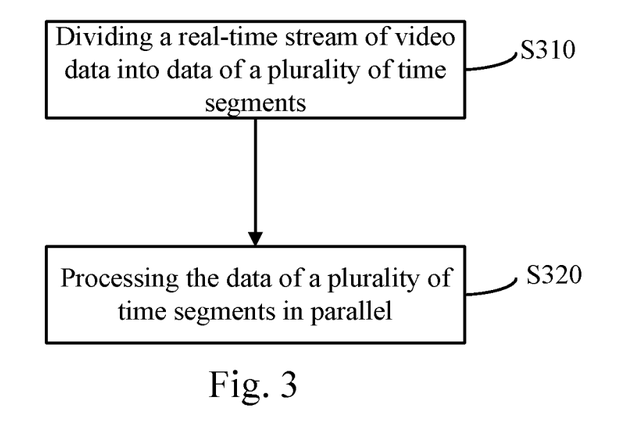
FIG. 3 is a flowchart illustrating a process for analyzing a video based on the method for security inspection of FIG. 1.

FIG. 3 is a flowchart illustrating a process for analyzing a video based on the method for security inspection of FIG. 1.

As shown in FIG. 3, at step S310, a real-time stream of video data is divided into data of a plurality of time segments.

At step S320, the data of a plurality of time segments are processed in parallel.

In an exemplary embodiment, in order to improve the performance of the algorithm, data structure is built by utilizing big data technology, and deployed on an Apache Spark architecture. By utilizing Spark streaming technology, it can improve performing efficiency of the algorithm, increase the speed of recognizing a baggage and a human face, and improve the recognition accuracy. Moreover, a massive of videos and images can be stored. Spark Streaming is a computational framework of a real-time stream built on Spark. Spark Streaming expands the capability of Spark in handling massive stream data. The basic principle of Spark Streaming is dividing input stream of data into time segments (the second level), and processing data of each time segment in a manner similar to parallel batch processing. Here, a video stream can be a real-time stream for input.

The Spark Streaming technology can be used for loading a video processing algorithm to achieve highly efficient algorithm performance. However, other technology for processing images in parallel can also be used, which is not limited herein.

With the method for security inspection according to the embodiments of the present disclosure, it can utilize the highly efficient performance of video analyzing algorithm provided by the big data technology. It can significantly increase the speed of recognizing a baggage and a human face, and improve the recognition accuracy.

Figure 4:
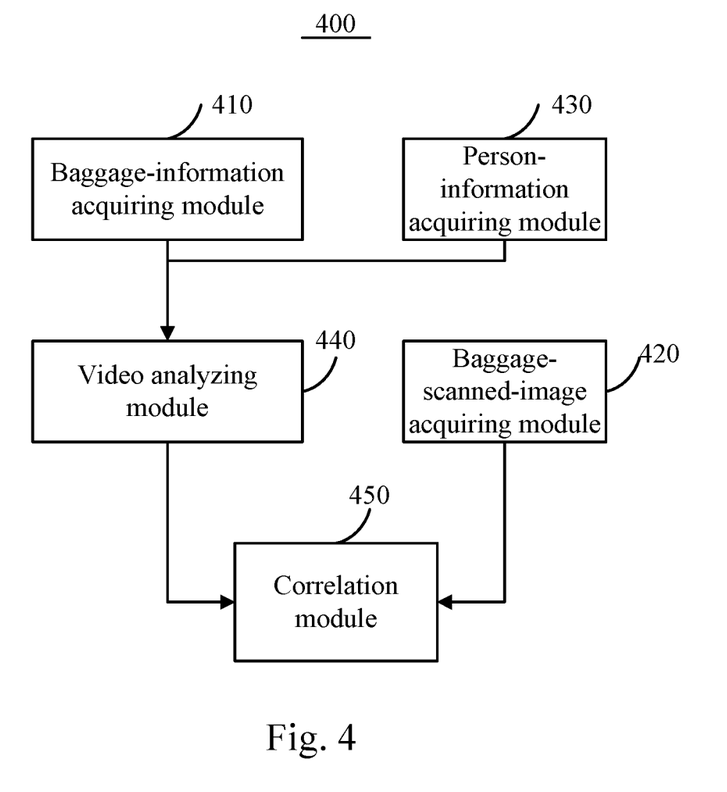
FIG. 4 is a block diagram illustrating a system for security inspection according to an exemplary embodiment of the present disclosure.

FIG. 4 is a block diagram illustrating a system for security inspection according to an exemplary embodiment of the present disclosure.

As shown in FIG. 4, the system 400 includes: a baggage-information acquiring module 410 configured to, before a baggage enters a security inspection machine and/or after the baggage leaves the security inspection machine, acquire information about the baggage and information about a subject person; a baggage-scanned-image acquiring module 420 configured to, while the baggage is inside the security inspection machine to be scanned, acquire a scanned image of the baggage; a person-information acquiring module 430 configured to, before a baggage enters a security inspection machine and/or after the baggage leaves the security inspection machine, acquire information about a subject person corresponding to the baggage; a correlation module 450 configured to correlate the information about the baggage, the scanned image of the baggage and the information about the subject person in a storage system; and a video analyzing module 440 configured to analyze a video for the baggage-information acquiring module 410 and the person-information acquiring module 430.

In an exemplary embodiment, the baggage-information acquiring module 410 includes: a baggage-video acquiring unit configured to acquire a video of the baggage; and a baggage analyzing unit configured to analyze the video of the baggage to acquire entrance baggage information about the baggage.

In an exemplary embodiment, the person-information acquiring module 430 includes: a baggage-retrieving-video acquiring unit configured to acquire a baggage retrieving video; and a baggage-retrieving analyzing unit configured to analyze the baggage retrieving video to acquire the information about the subject person.

In an exemplary embodiment, the baggage-retrieving analyzing unit includes: a baggage analyzing sub-unit configured to analyze the baggage retrieving video to acquire an exit baggage information; a retriever analyzing sub-unit configured to analyze the baggage retrieving video to acquire the information about the subject person who retrieves the baggage; and a baggage matching sub-unit configured to match the entrance baggage information with the exit baggage information, so as to identify the baggage when the baggage leaves the security inspection machine.

In an exemplary embodiment, the baggage-retrieving analyzing unit includes: a first time-matching sub-unit configured to match a time when the baggage enters the security inspection machine with a time when the baggage leaves the security inspection machine, so as to identify the baggage when the baggage leaves the security machine; and a retriever analyzing sub-unit configured to analyze the baggage retrieving video to acquire the information about the subject person who retrieves the baggage.

In an exemplary embodiment, the baggage-scanned-image acquiring module 420 includes: a second time-matching unit configured to match a calculated time when the scanned image of the baggage is generated with an actual time when the scanned image is generated, to acquire the scanned image of the baggage.

In an exemplary embodiment, the video analyzing module 440 includes: a time-segment dividing unit configured to divide a real-time stream of video data into data of a plurality of time segments; and a processing unit configured to process the data of a plurality of time segments are in parallel.

In an exemplary embodiment, the system also includes a storage module configured to store the information about the baggage, the scanned image of the baggage and the information about the subject person who retrieves the baggage in a system server.

In an exemplary embodiment, the information about the baggage can include at least one of the following: an image, a color and a size.

In an exemplary embodiment, the information about the subject person who retrieves the baggage can include at least one of the following: an image of the face, a fragment of the baggage retrieving video.

In an exemplary embodiment, the scanned image can be an X-ray image.

Specific implementation of each of the modules of the system in the above embodiment have been described in detail with reference to relevant method embodiments, therefore a detailed description of the modules will not be elaborated herein.

Figure 5:
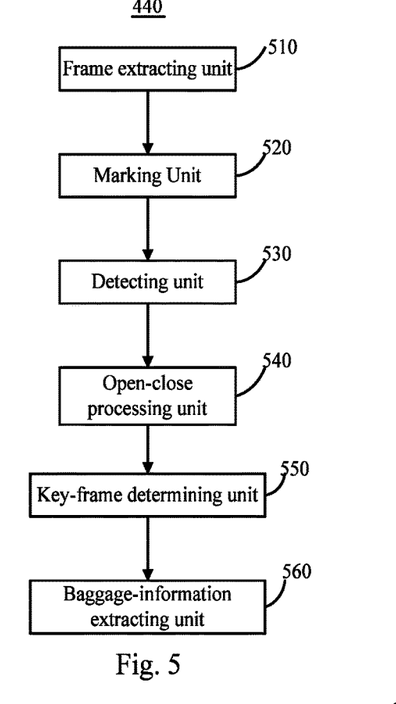
FIG. 5 is a block diagram illustrating a video analyzing module based on the system for security inspection of FIG. 4.

FIG. 5 is a block diagram illustrating the video analyzing module 440 based on the system for security inspection of FIG. 4.

As shown in FIG. 5, the video analyzing module 440 includes: a frame extracting unit 510 configured to decode a stream of a video to extract a single frame; a marking unit 520 configured to mark an interested region and an interested line on an image of the frame; a detecting unit 530 configured to detect a dynamic object in the interested region; an open-close processing unit 540 configured to acquire a foreground view and perform opening and closing process on the foreground view; a key-frame determining unit 550 configured to determine whether a frame is a key frame by comparing the frame with a preceding frame to see whether the dynamic object has crossed the interested line after the dynamic object leaves the security inspection machine; and a baggage-information extracting unit 560 configured to extract and store the information about the baggage of the dynamic object in the key frame.

Figure 6:
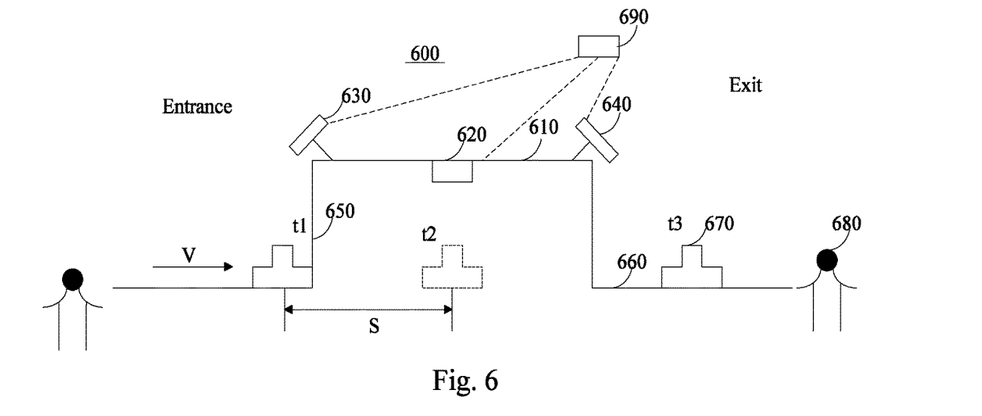
FIG. 6 is a schematic diagram illustrating a device for security inspection according to an exemplary embodiment of the present disclosure.

FIG. 6 is a schematic diagram illustrating a device 600 for security inspection according to an exemplary embodiment of the present disclosure.

As shown in FIG. 6, the device 600 for security inspection includes cameras 630 and 640 and a security inspection machine 610. The cameras 630 and 640 are disposed at an entrance side and/or an exit side of the security inspection machine 610, and configured to acquire a video of a baggage and a video of a subject person before the baggage enters the security inspection machine 610 and/or after the baggage leaves the security inspection machine 610. The security inspection machine 610 is configured to scan a baggage while the baggage is inside the security inspection machine to be scanned, so as to generate a scanned image of the baggage.

In an exemplary embodiment, the camera 630 can be disposed at the entrance side of the security inspection machine. Before the baggage enters the security inspection machine, the camera can acquire the information about the baggage and the information about the subject person. The information about the baggage and the information about the subject person can be acquired at the same time by the same camera. In this case, through image processing, the information about the baggage and the information about the subject person can be extracted separately. Alternatively, two cameras can be disposed at the entrance side of the security inspection machine. In this case, one of the cameras is configured to acquire the information about the subject person, and the other of the cameras is configured to acquire the information about the baggage.

In an exemplary embodiment, the camera 640 can be disposed at the exit side of the security inspection machine. After the baggage leaves the security inspection machine, the camera at the security inspection machine can acquire a baggage retrieving video. By analyzing the baggage retrieving video, the information about the baggage and the information about the subject person can be acquired.

In an exemplary embodiment, the cameras include a first camera 630 and a second camera 640. The first camera 630 is disposed at the entrance side of the security inspection machine 610, configured to acquire an entrance-baggage video before the baggage enters the security inspection machine 610. The second camera 640 is disposed at the exit side of the security inspection machine 610, configured to acquire the baggage retrieving video after the baggage leaves the security inspection machine 610. By analyzing the baggage retrieving video, exit baggage information and the information about the subject person can be acquired. Through an algorithm (for example, time and/or properties of the baggage), the entrance baggage information is matched with the exit baggage information to acquire the information about the baggage.

In an exemplary embodiment, before the baggage enters the security inspection machine 610, entrance baggage information and entrance person information are acquired by the first camera 630 disposed at the entrance side of the security inspection machine. After the baggage leaves the security inspection machine 610, a baggage retrieving video is acquired by the second camera 640 disposed at the exit side of the security inspection machine. By analyzing the baggage retrieving video, exit baggage information and exit person information can be acquired. Through an algorithm, the entrance baggage information is matched with the exit baggage information to acquire the information about the baggage, and the entrance person information is matched with the exit person information to acquire the information about the subject person.

In an exemplary embodiment, the example of the first camera 630 and the second camera 640 does not limit the number of the cameras. The first camera 630 can be one camera or more than one camera. Similarly, the second camera 640 can also be one camera or more than one camera. Although in FIG. 6, the cameras are installed at an upper side of the security inspection machine 610, in practice, the cameras can be installed at any position at the entrance side and/or exit side of the security inspection machine 610, and even can be disposed at the entrance of the door of a subway or railway station, as long as the camera can capture images about humans and/or objects within its monitoring region. This is not limited in the present disclosure.

In an exemplary embodiment, the security inspection machine 610 can further include an X-ray machine with a head portion 620, a lead curtain 650 and a conveyor belt 660.

In an exemplary embodiment, the baggage retrieving video contains the baggage 670 and the subject person 680.

In an exemplary embodiment, the subject person 680 puts the baggage 670 on the conveyor belt 660 of the security inspection machine 610. The first camera 630 acquires a video of the baggage 670. An image of the video of the baggage 670 is analyzed through a video analyzing algorithm to acquire properties of the baggage. When the baggage 670 moves on the conveyor belt 660 to the lead curtain 650 at the entrance side of the security inspection machine 610, this position of the baggage can be detected through the video analyzing algorithm and a time instance t1 is recorded. According to a horizontal distance s between the lead curtain 650 of the security inspection machine 610 and the head portion 620 of the X-ray machine of the security inspection machine 610, and a moving speed v of the conveyor belt 660 of the security inspection machine 610, a time t2 when the X-ray image of the baggage 670 is generated can be calculated as (t2=t1+s/v). Therefore, the X-ray image at the time instance t2 shows the baggage. At the exit side of the security inspection machine 610, the image of the baggage 670 and the face of the subject person 680 can be detected through the video analyzing algorithm.

In an exemplary embodiment, by matching with the images of the baggage at the entrance and the exit of the security inspection machine through the video analyzing algorithm, the face image of the subject person 680 can be extracted.

In an exemplary embodiment, according to a horizontal distance S between the lead curtain 650 at the entrance side of the security inspection machine 610 and the head portion 620 of the X-ray machine of the security inspection machine 610, and a moving speed v of the conveyor belt 660 of the security inspection machine 610, a time t3 when the baggage 670 comes out from the exit side of the security inspection machine 610 can be calculated as (t3=t1+S/v). In this way, the baggage at the entrance can be matched with the baggage at the exit. The image of the baggage at the entrance, the X-ray image of the baggage at the time instance t2 and the face image of the subject person 680 at the exit can be correlated or bound with one another.

In an exemplary embodiment, the time instance t3 when the baggage 670 reaches the lead curtain 650 at the exit side of the security inspection machine 610 can be recorded. According to a horizontal distance S1 between the lead curtain 650 at the exit side of the security inspection machine 610 and the head portion 620 of the X-ray machine of the security inspection machine 610, and a moving speed v of the conveyor belt 660 of the security inspection machine 610, a time t2 when the baggage 670 reaches the head portion 620 of the X-ray machine of the security inspection machine 610 can be calculated as (t2=t3−S1/v). The image of the baggage acquired at the exit, the X-ray image of the baggage at the time instance t2 and the face image of the subject person 680 at the exit can be correlated or bound with one another.

In an exemplary embodiment, the device further includes a controlling unit 690, the controlling unit is capable of performing the method for security inspection as described in the above embodiments.

FIG. 1 is a flowchart illustrating a method for security inspection according to an exemplary embodiment of the present disclosure. The method can utilize for example the system and the device for security inspection as shown in FIG. 4, 5 or 6, to which the present disclosure is not limited. It should be noted that, FIGS. 1, 2 and 3 are merely for illustration of the process of the method according to the embodiments of the present disclosure, rather than for limitation purpose. It should be readily understood that FIGS. 1, 2 and 3 do not define or limit the time sequence of the processing. In addition, it should also be readily understood that these steps can be performed in a plurality of modules/processes/threads in parallel or not in parallel, for example.

From the above description of the embodiments, it should be readily understood by those skilled in the art that the exemplary embodiments described herein can be implemented in software, or can be implemented by combination of software with necessary hardware. Therefore, the technical solution of the embodiments of the present disclosure can be embodied in software product which is stored on a non-transient storage medium (can be a CD-ROM, a U disk, a movable hard disk and so on) or over network, and can include instructions to cause a computer (can be a personal computer, a server, a mobile terminal, or a network device and so on) to perform the method according to the embodiments of the present disclosure.

It should be understood by those skilled in the art that the accompanying drawings are only illustration of the exemplary embodiments, the modules or steps in the accompanying drawings may be not essential for the present disclosure. Therefore, they do not constitute limitation to the protective scope of the present disclosure.

It should be understood by those skilled in the art that the above modules can be distributed in devices according to the description of the embodiments, or can be located in one or more devices by modifying the embodiments of the present disclosure. The modules of the embodiments can be combined into one module, or can be further divided into more than one sub-modules.

The exemplary embodiments of the present disclosure have been illustrated and described above. It should be understood that, the present disclosure is not limited to the embodiments disclosed. Instead, the present disclosure intends to cover all the alteration and equivalent replacement within the spirit and scope of the appending claims.

What is claimed is:

1. A method for security inspection, comprising:
before a baggage enters a security inspection machine and after the baggage leaves the security inspection machine, acquiring information about the baggage and information about a subject person;
while the baggage is inside the security inspection machine to be scanned, acquiring a scanned image of the baggage; and
correlating the information about the baggage, the scanned image of the baggage and the information about the subject person in a storage system,
wherein the acquiring the information about the baggage and the information about the subject person comprises analyzing a video,
wherein the acquiring the information about the baggage comprises:
acquiring a video of the baggage; and
analyzing the video of the baggage to acquire entrance baggage information about the baggage,
wherein the acquiring the information about the subject person comprises:
acquiring a baggage retrieving video; and
analyzing the baggage retrieving video to acquire the information about the subject person who retrieves the baggage, and
wherein the analyzing the baggage retrieving video to acquire the information about the subject person comprises:
matching a time when the baggage enters the security inspection machine with a time when the baggage leaves the security inspection machine to identify the baggage when the baggage leaves the security machine; and
analyzing the baggage retrieving video to acquire the information about the subject person who retrieves the baggage.

2. The method of claim 1, wherein acquiring a scanned image of the baggage comprises:
matching a calculated time when the scanned image of the baggage is generated with an actual time when the scanned image is generated, to acquire the scanned image of the baggage.

3. The method of claim 1, wherein analyzing a video comprises:
decoding a stream of a video to extract a single frame;
marking an interested region and an interested line on an image of the frame;
detecting a dynamic object in the interested region;
acquiring a foreground view and performing opening and closing process on the foreground view;
once in the processed foreground view, the dynamic object has crossed the interested line, comparing the current frame with a state of the preceding frame and determining whether the current frame is a key frame;
if the current frame is a key frame, extracting and storing infor aation about a baggage of the dynamic object in the key frame; and
if it is not a key frame, extracting a next frame.

4. The method of claim 1, wherein analyzing a video comprises:
dividing a real-time stream of video data into data of a plurality of time segments; and
processing the data of a plurality of time segments in parallel.

5. The method of claim 1, wherein the method further comprises storing the information about the baggage, the scanned image of the baggage and the information about the subject person who retrieves the baggage in a system server.

6. A device for security inspection, comprising a camera and a security inspection machine, wherein,
the camera is disposed at an entrance side and an exit side of the security inspection machine and configured to acquire a video of a baggage and a video of a subject person before the baggage enters the security inspection machine and/or after the baggage leaves the security inspection machine; and
the security inspection machine is configured to scan a baggage while the baggage is inside the security inspection machine to be scanned, to generate a scanned image of the baggage,
wherein the camera comprises a first camera and a second camera,
wherein the first camera is disposed at the entrance side of the security inspection machine configured to acquire an entrance baggage video before the baggage enters the security inspection machine,
wherein the second camera is disposed at the exit side of the security inspection machine, configured to acquire and extract a video of the subject person who retrieves the baggage after the baggage leaves the security inspection machine, and
wherein the device further comprises a controlling unit configured to perform the method of claim 1.

7. The device of claim 6, wherein acquiring a scanned image of the baggage comprises:

matching a calculated time when the scanned image of the baggage is generated with an actual time when the scanned image is generated, to acquire the scanned image of the baggage.

8. The device of claim 6, wherein analyzing a video comprises:
  decoding a stream of a video to extract a single frame;
  marking an interested region and an interested line on an image of the frame;
  detecting a dynamic object in the interested region;
  acquiring a foreground view and performing opening and closing process on the foreground view;
  once in the processed foreground view, the dynamic object has crossed the interested line, comparing the current frame with a state of the preceding frame and determining whether the current frame is a key frame;
  if the current frame is a key frame, extracting and storing information about a baggage of the dynamic object in the key frame; and
  if it is not a key frame, extracting a next frame.

9. The device of claim 6, wherein analyzing a video comprises:
  dividing a real-time stream of video data into data of a plurality of time segments; and
  processing the data of a plurality of time segments in parallel.

10. The device of claim 6, wherein the method further comprises storing the information about the baggage, the scanned image of the baggage and the information about the subject person who retrieves the baggage in a system server.

* * * * *